United States Patent
Peng

(10) Patent No.: US 6,845,151 B2
(45) Date of Patent: Jan. 18, 2005

(54) PICTURE/SOUND OUTPUT EQUIPMENT WITH CALLER IDENTIFICATION AND VOLUME ADJUSTMENT FUNCTIONS

(75) Inventor: Jack Peng, Chung Li (TW)

(73) Assignee: Meiloon Industrial Co., Ltd., Taipei (TW)

( * ) Notice: Subject to any disclaimer, the term of this patent is extended or adjusted under 35 U.S.C. 154(b) by 17 days.

(21) Appl. No.: 10/066,629

(22) Filed: Feb. 6, 2002

(65) Prior Publication Data

US 2003/0147517 A1 Aug. 7, 2003

(51) Int. Cl.[7] .................. H04M 1/56; H04M 15/06; H04M 11/00
(52) U.S. Cl. .................. 379/142.06; 379/142.01; 379/142.13; 379/142.17; 379/93.23; 379/102.03
(58) Field of Search .................. 379/142.01, 142.04, 379/142.07, 142.13, 142.14, 142.15, 142.16, 142.17, 93.05, 93.15, 93.17, 93.23, 102.01, 102.02, 102.03; 381/56, 57, 28; 348/14.04, 14.07

(56) References Cited

U.S. PATENT DOCUMENTS

| | | | | |
|---|---|---|---|---|
| 5,528,673 A | * | 6/1996 | Rosenthal | 379/102.03 |
| 5,987,106 A | * | 11/1999 | Kitamura | 379/110.01 |
| 6,052,444 A | * | 4/2000 | Ferry et al. | 379/93.35 |
| 6,141,058 A | * | 10/2000 | Lagoni et al. | 348/563 |
| 6,154,531 A | * | 11/2000 | Clapper | 379/142.14 |
| 6,546,092 B2 | * | 4/2003 | Corbett et al. | 379/93.35 |
| 6,690,778 B2 | * | 2/2004 | Kahn | 379/110.01 |

* cited by examiner

Primary Examiner—Quoc Tran
(74) Attorney, Agent, or Firm—Dennison, Schultz, Dougherty & MacDonald

(57) ABSTRACT

A picture/sound output equipment with caller identification and volume adjustment functions comprises a main unit provided with buttons and picture/sound output hole for connection to the screen and amplifier; and an incoming-call detection circuit connecting to telephone line on one end and connecting to the main unit on the other end. The incoming-call detection circuit transforms the signals of incoming calls into visual signals and outputs the visual signals. When the picture/sound output equipment is in use and the phone rings, the signals of incoming calls will be located and displayed on the screen, thereby helps users not to miss the phone calls as they watch films.

3 Claims, 5 Drawing Sheets

PICTURE/SOUND OUTPUT EQUIPMENT WITH CALLER IDENTIFICATION AND VOLUME ADJUSTMENT FUNCTIONS

BACKGROUND OF THE INVENTION

1. Field of the Invention

The present invention relates to an improvement of caller identification device, especially referring to a picture/sound output equipment with caller identification and volume adjustment functions that displays the caller's telephone number when the picture/sound output equipment is in use, thereby help users not to miss the incoming phone calls.

2. Description of the Prior Art

The conventional picture/sound output equipment, such as VCRs, VCD players, and DVD players, is provided with the basic picture/sound output devices for connection to TV. When turned on, the picture/sound output equipment displays the contents of videotapes/CDs on TV screen. Users can adjust certain functions of the picture/sound output equipment through the menus shown on the screen.

Users tend to increase the volume of picture/sound output equipment for excitement when they watch the special-effect motion pictures. As the volume is increased, users may not hear the telephone ring and eventually miss their phone calls. There are telephone sets provided with caller identification device that records the callers' telephone numbers, so users can call back after verifying the callers' telephone numbers. However, users need to check their caller identification devices personally when their telephones ring and, therefore, the caller identification devices do not serve the purpose sufficiently.

The inventor has studied the foregoing problems thoroughly and conducted numerous tests; then created the present invention.

SUMMARY OF THE INVENTION

The present invention relates to a sound/sound output equipment with caller identification and volume adjustment functions that displays caller's phone number on the screen while playing motion pictures/sounds, thereby keep users aware of incoming calls.

Secondly, the picture/sound output equipment with caller identification and volume adjustment functions decreases the volume of picture/sound output equipment automatically as soon as the incoming phone call is detected.

To serve the foregoing purposes, the present invention is provided with a main unit equipped with buttons and picture/sound output hole for connection to the screen and amplifier, and an incoming-call detection circuit connecting to telephone line on one end and connecting to the main unit on the other end. The incoming-phone detection circuit transforms the signals of incoming calls into visual signals and outputs the visual signals. When the picture/sound output equipment is in use and the telephone rings, the signals of incoming calls appear on the screen, so users will not miss any phone calls.

The present invention will be apparent in its contents of technique after reading the detailed description of the preferred embodiments of the present invention in reference to the accompanying drawings, wherein:

DETAILED DESCRIPTION OF THE PREFERRED EMBODIMENT

Figure 1:
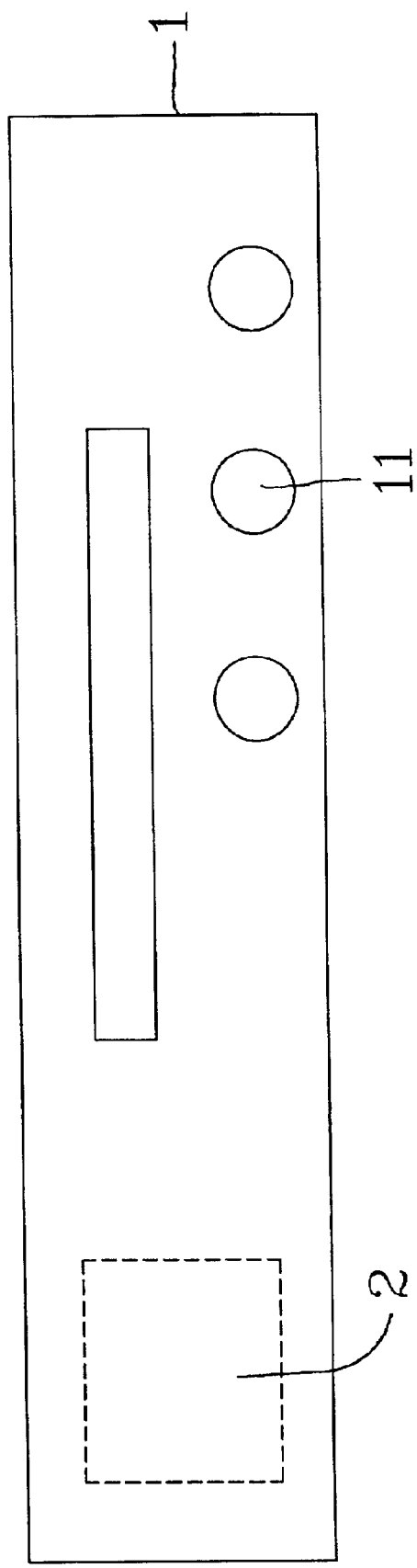
FIG. 1 is a plain view showing the structure of present invention.
Figure 2:
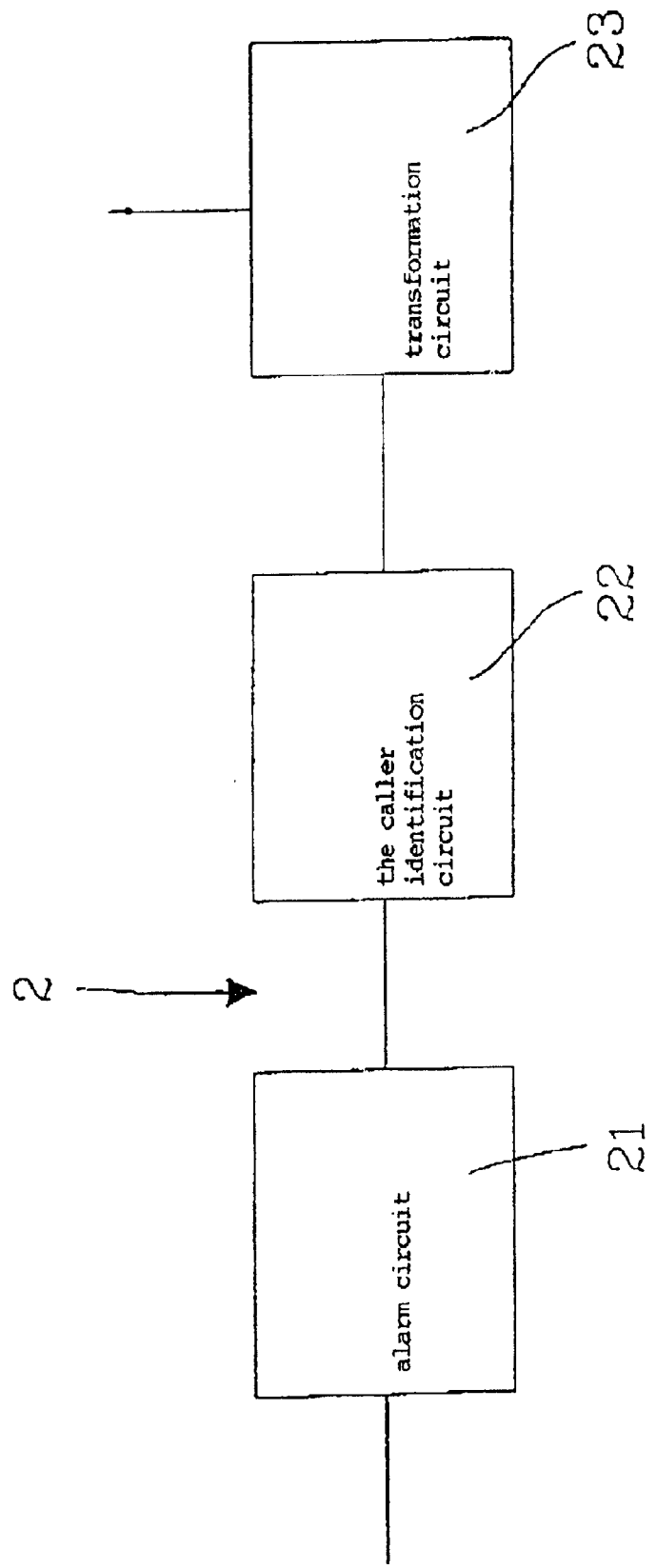
FIG. 2 is a circuit diagram of the present invention.
Figure 3:
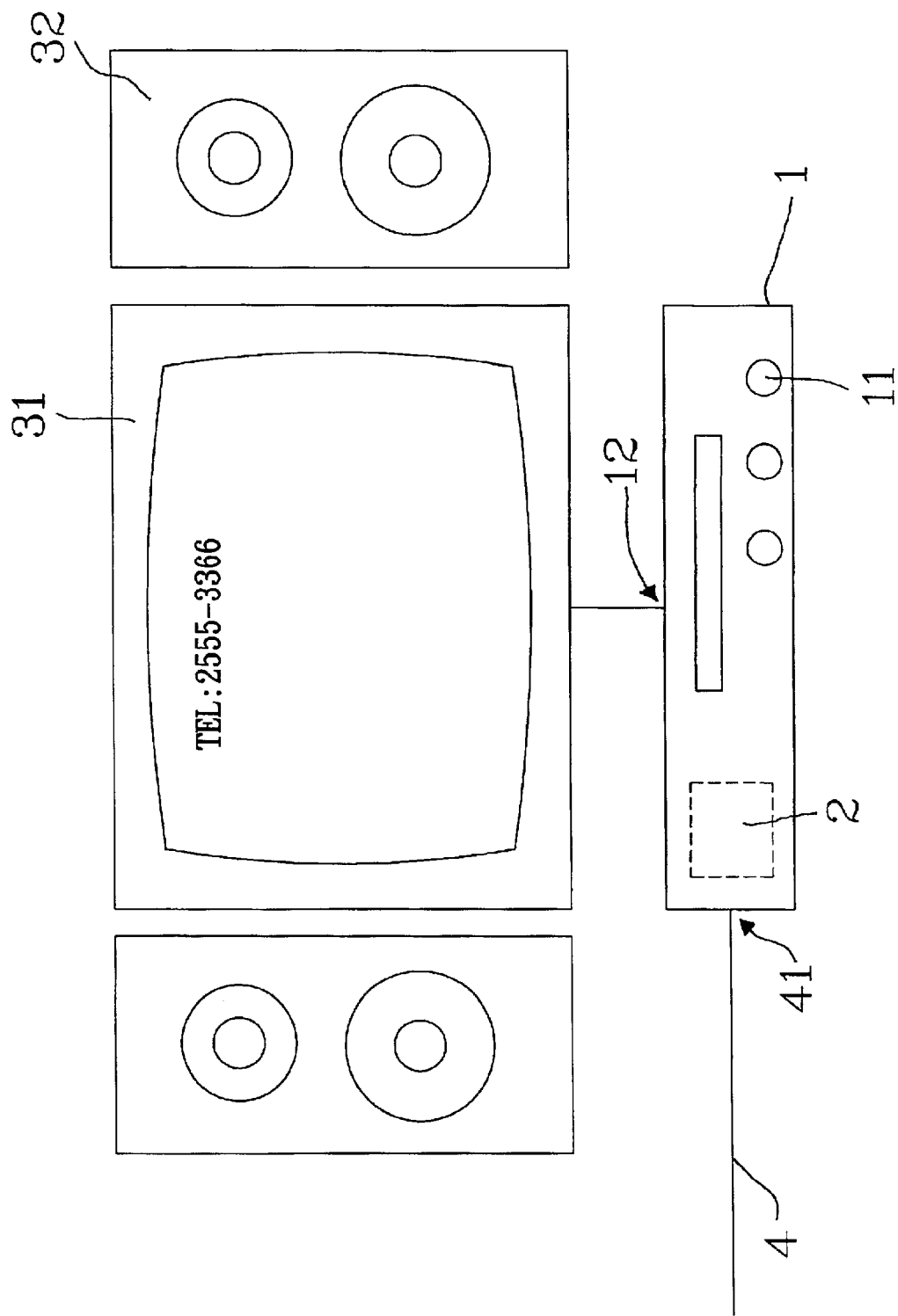
FIG. 3 is a schematic view showing the application of present invention.

As shown by FIG. 1~FIG. 3, the present invention is provided with a main unit 1 and an incoming-call detection circuit 2.

The main unit 1 is provided with buttons 11 and picture/sound output hole 12 for connection to screen 31 and amplifier 32.

The incoming-call detection circuit 2 connects to telephone line 4 on one end and connects to the main unit 1 on the other end. The incoming-call detection circuit 2 transforms the signals of incoming calls into visual signals and outputs the visual signals.

The incoming-call detection circuit 2 can be either a separate device (not shown in the drawings) or provided inside the main unit 1. The main unit 1 can be a VCR, DVD, or VCD provided with phone jack 41 for connection to telephone line 4.

The incoming-call detection circuit 2 comprises an alarm circuit 21 for detecting the ringing of incoming calls, a caller identification circuit 22 for identifying caller's messages such as the phone number or brief message of incoming call, and a transformation circuit 23 for transforming messages into visual messages.

As shown by FIG. 3, after the main unit 1 is installed, users may plug the telephone line 4 into the phone jack 41. When the picture/sound output equipment is in use and the phone rings, the alarm circuit 21 locates the signals of incoming calls; the caller identification circuit 22 verifies the caller's message and phone number; and the transformation circuit 23 transforms the message/number into visual message and displays the visual message on the screen. Therefore, users can be aware of the incoming calls and answer their phones as they watch films.

Figure 4:
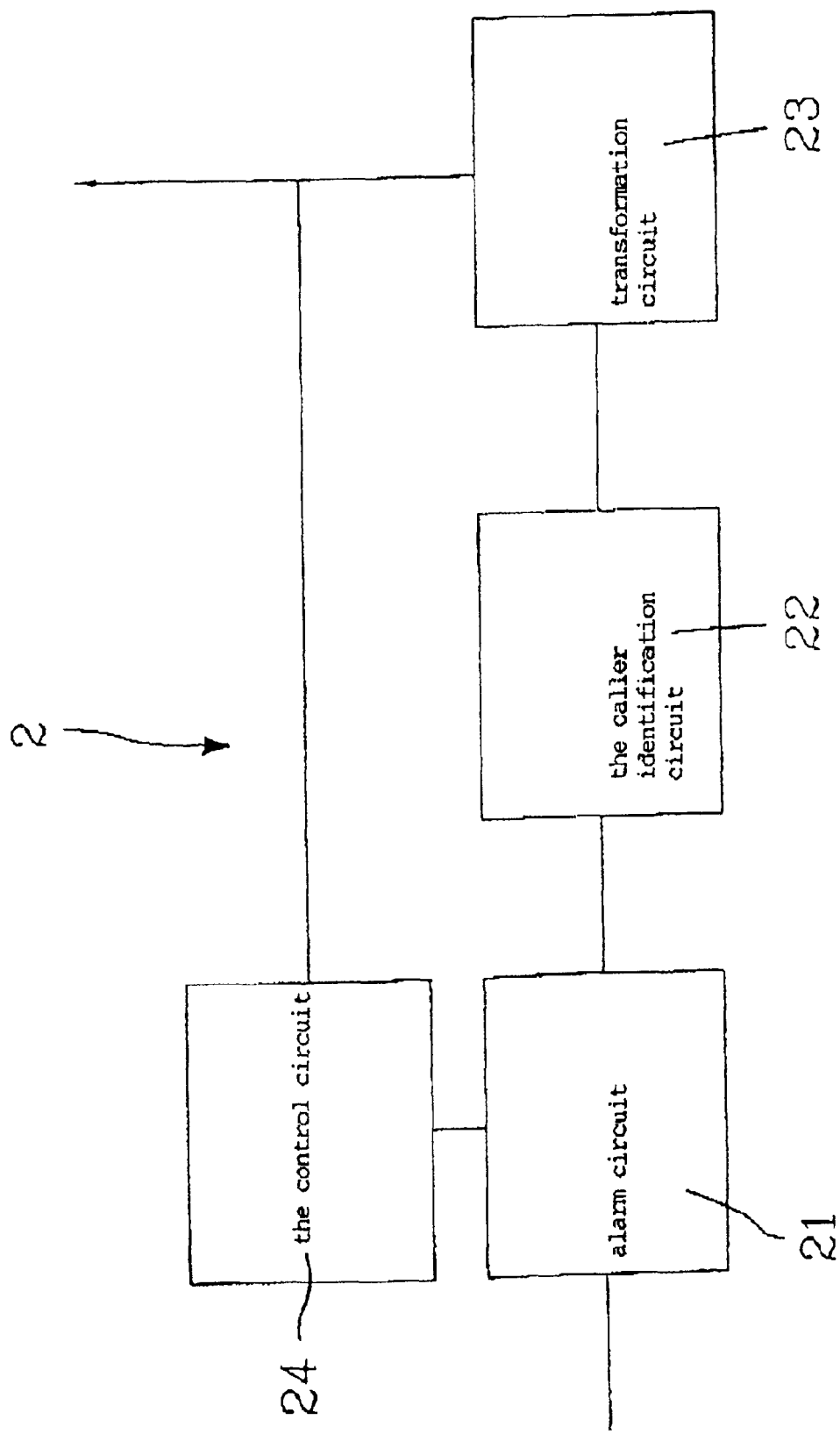
FIG. 4 is a circuit diagram showing the present invention provided with automatic volume control function.
Figure 5:
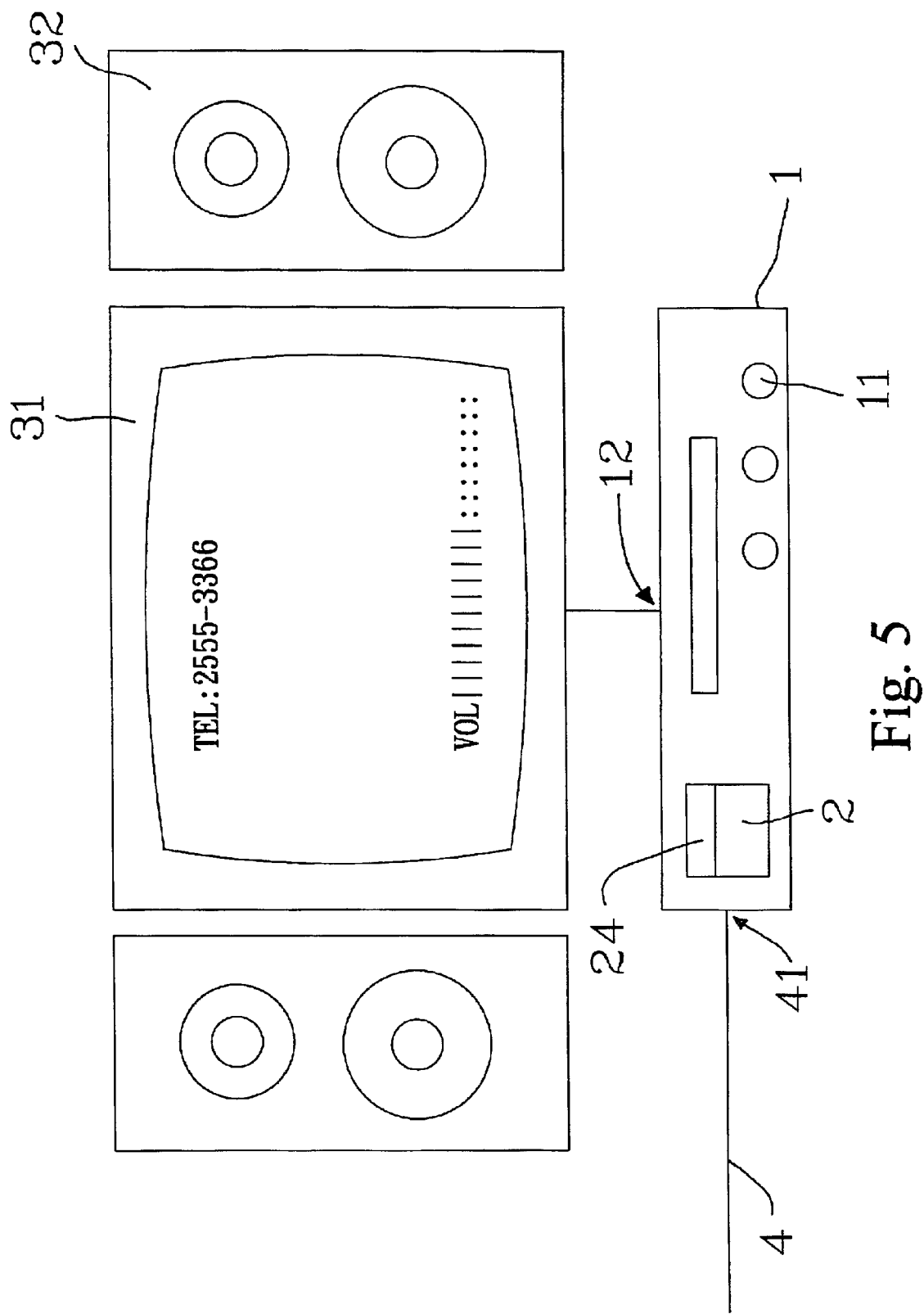
FIG. 5 is a schematic view showing the application of present invention provided with automatic volume control function.

As shown by FIG. 4 and FIG. 5, users can install a control circuit 24 in the incoming-call detection circuit 2 that connects to the volume adjustment device of the main unit 1. Thus, when the picture/sound output equipment is in use and the telephone rings, the messages related to the incoming phone call will be displayed on the screen 31 and the volume will be decreased via the control circuit 24, thereby conveniences users to answer the phone. After users hang up the phone, the volume will be adjusted back to the previous level.

As described in the preceding statement, the present invention keeps users informed of incoming phone calls as they use the picture/sound output equipment; and such function is not available for the conventional picture/sound output equipment. Therefore, the present invention is industrially valuable.

The present invention has been described in conjunction with the preferred embodiment. To those skilled in the art, modification may be made in the invention without departing from the spirit and scope of the subject invention as set forth in the claims below.

Having thus described my invention, what the inventor claims as new and desire to be secured by Letters Patent of the United States include:

1. A picture/sound output equipment having caller identification and volume adjustment functions operable with a screen and an amplifier, comprising:

a main unit having phone jack, a plurality of buttons and a picture/sound output hole for connection to the screen and the amplifier;

an incoming call-detection circuit disposed in the main unit and comprising, an alarm circuit for detecting the ringing of the incoming calls, a caller identification circuit for identifying the caller's phone number and an brief message, a transformation circuit for transforming messages into visual messages, and a control circuit operably connected to a volume adjustment of the main unit, wherein said incoming call-detection circuit is operably connected to a telephone line at one end and operably connected to the main unit at a second end, wherein said incoming-call detection circuit transforms messages of an incoming call into visual signals and outputs the visual signals.

2. A picture/sound output equipment claim 1, wherein the main unit is a VCR, a DVD player, or a VCD player.

3. A method of displaying a caller's phone number on a screen, comprising the steps of:

providing an amplifier;

providing a picture/sound out equipment having caller identification and volume adjustment feature;

providing a main unit having a plurality of buttons and a picture/sound output hole;

operably connecting the main unit to the screen and the amplifier;

providing an incoming-call detection circuit disposed in the main unit and comprising an alarm circuit for detecting the ringing of the incoming calls, a caller identification circuit for identifying the caller's phone number and an brief message, a transformation circuit for transforming messages into visual messages, and a control circuit operably connected to a volume adjustment of the main unit, wherein said incoming call-detection circuit is having a first end and a second end;

operably connecting the incoming-call detection circuit to a telephone line the first end and to the main unit at the second end;

transforming the message of the incoming call into visual signals by the incoming-call detection circuit.

* * * * *